Aug. 3, 1954   F. W. UNDERWOOD   2,685,434
AIR CONDITIONING APPARATUS
Filed Nov. 4, 1952
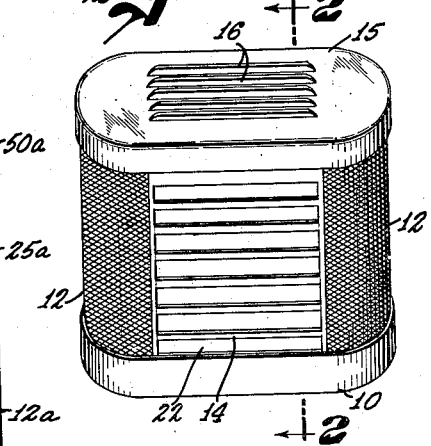
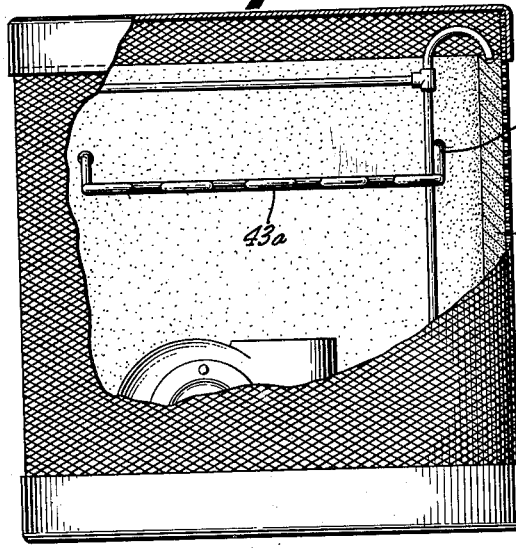
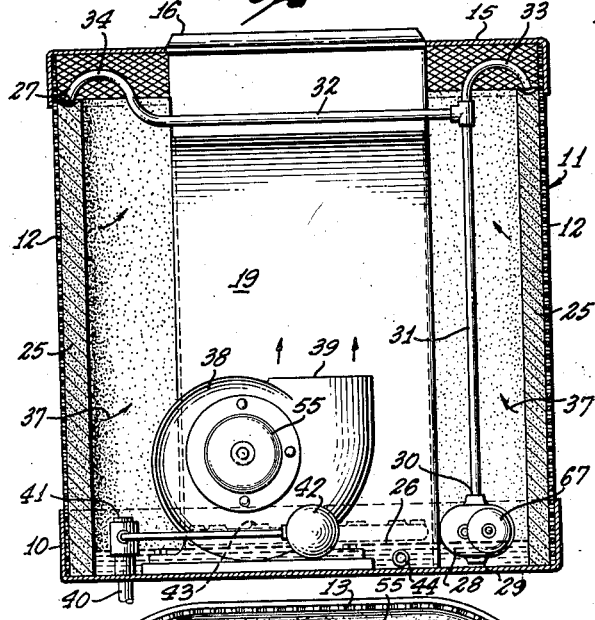
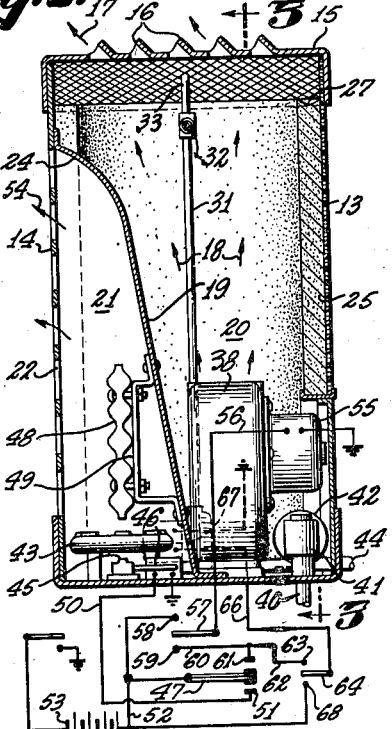
INVENTOR:
FRED W. UNDERWOOD
BY Sellers and Latta
ATTORNEYS.

Patented Aug. 3, 1954

2,685,434

UNITED STATES PATENT OFFICE 2,685,434

AIR CONDITIONING APPARATUS

Fred W. Underwood, Van Nuys, Calif.

Application November 4, 1952, Serial No. 318,583

3 Claims. (Cl. 257—9)

This invention relates to air conditioning apparatus and has as its general object to provide a relatively simple combination heating and cooling unit of the console type.

A particular object of the invention is to provide a relatively inexpensive air conditioning unit, adapted, when temperature is high, to provide for cooling by the passage of air through water soaked air porous dissipater means, the evaporation of water effecting the cooling of the air as it is forcibly circulated through the apparatus; and the apparatus further having heating means which is operable when temperature conditions call for heat.

Other objects will become apparent in the ensuing specifications and appended drawings in which:

Fig. 1 is a perspective view of a combined heater and cooler embodying the invention;

Fig. 2 is a composite system diagram and vertical sectional view thereof taken on the line 2—2 of Fig. 1;

Fig. 3 is a vertical sectional view of the same taken on the line 3—3 of Fig. 2;

Fig. 4 is a plan view of the same with the cover removed;

Fig. 5 is a front elevation of a modified form of the invention, with parts broken away and shown in section; and Fig. 6 is a detail sectional view of a portion of a moisture dispersion panel.

Referring now to the drawings in detail, I have shown in Figs. 1-4, as an example of one form in which the invention may be embodied, a combined air heater and cooler utilizing a gas burner as the heating means thereof. The appliance has a bottom in the form of a pan 10 for holding a body of water 26 which is utilized for cooling purposes. A tubular casing wall of composite construction projects upwardly from pan 10. This tubular casing wall is indicated generally by the reference numeral 11. At the respective sides of the appliance, it includes air pervious side panels 12 of expanded metal, each of these side panels being of semi-cylindrical form. The tubular casing member 11 also includes a back panel 13, also of expanded metal, and a front panel 14 in the form of a grill. The grill 14 functions as a guard to protect a person standing in front of the appliance, against danger of having clothing catch fire from the gas heater therein. In the specific form shown, side panels 12 and back panel 13 are integrally formed from a single sheet of expanded metal.

A cap 15 is attached to and covers the upper end of the tubular casing member 11. Cap 15 is of sheet metal and has a plurality of parallel, longitudinally extending louvers 16 adapted to direct in a forward direction as indicated by arrows 17 (Fig. 2), air currents ascending within the casing as indicated by arrows 18.

The interior of the casing is divided, by a reflector baffle 19, into a blower chamber 20 and a heater chamber 21. Blower chamber 20 is disposed in the rear of the casing and heater chamber 21 is arranged in the front of the casing, directly behind grill 14, so as to communicate with atmosphere through the openings 22 between the bars of the grill 14. Reflector baffle 19 has side portions 23 which extend forwardly to meet the side margins of grill 14. Side portions 23 are curved, as shown in Fig. 4, so as to merge tangentially with the central portion of reflector baffle 19, and the upper portion of the reflector baffle is curved forwardly, at 24, to meet grill 14, thus completely separating chamber 20 from chamber 21.

Mounted in the casing, against the inner surface of air pervious side panels 12 and rear panel 13, is a moisture dispersion panel 25 including a pair of semi-cylindrical side portions. Panel 25 extends to the side margins of grille 14 and completely covers the open areas defined by the side panels 12 and back panel 13.

Moisture dispersion panels 25 are of porous, cellular, water absorbent, air pervious material having the characteristic of holding in suspension, a fairly large quantity of water while allowing air to readily pass through it so as to be humidified by such suspended water. The texture of the body is generally as indicated in Fig. 6, particles or fibers 25' being bonded together where they touch each other and being separated by interstices 25'' which are interconnected to provide a continuous network of passages having a sponge-like quality of holding a large quantity of water in suspension in a cellular film which may be readily penetrated by air currents, and which may be readily absorbed in the air current.

The invention provides for the pumping of water from a body of water indicated at 26 in Fig. 3, upwardly to a shallow trough 27 in the upper ends of the panel 25. For this purpose, I provide a pump 28, suitably mounted in the bottom pan 10, having an inlet 29 to receive water from the body 26 in which it is immersed, and having an outlet 30 which communicates by lines of tubing 31, 32 to the respective ends of trough 27, the upper ends of the lines 32 being curved downwardly to form goose neck discharge spouts 33, 34.

Water is distributed from troughs 27 downwardly into panel 25 through the network of interstices 25'', whence it is disbursed into the air current passing through panel 25 as indicated by arrows 37. In this connection, it will be understood that the interstices 25'' communicate with trough 27.

A blower 38 is mounted in blower chamber 20 and has an outlet 39 discharging upwardly for creating in chamber 20, the upward flow 18 of air entering the chamber through panel 25 as indicated by arrows 37 and discharging through the louver outlets in the cap 15 as indicated by arrows 17.

The pan 10 is supplied with water by any suitable means such as a water supply connection 40 controlled by a float valve 41 having a float 42 actuated by the body of water 26 to maintain the level thereof at a selected height.

Suitably mounted in heater compartment 21 is a heater, which in the form of the invention shown in Figs. 1–4, comprises a gas burner 43 connected to a gas supply line 44 and having a suitable starting pilot 45. The flow of gas through burner 43, between the connection to pilot 45 and the burner, is controlled thermostatically by a suitable thermoresponsive valve 46. Valve 46 may, for example, be of a well known solenoid actuated type, controlled by a room temperature thermostat 47. For the most efficient dispersion of the heat from burner 43, I provide a heat absorption and radiating element 48 (e. g. a clay radiant), suitably supported as by means of a bracket 49 attached to reflector baffle 19.

Control system and operation

In general, the control apparatus of the invention embodies means which may be set to automatically change over from heating to cooling, activating the apparatus for heating within a selected lower range of room temperatures, activating the apparatus for cooling within a selected upper range of room temperatures, and providing an intermediate range of temperature in which the apparatus is inactive. For heating, the normal, automatic operation of the apparatus will provide for turning off the water supply and water pumping mechanism and turning on the burner 43. For cooling, the normal automatic operation of the apparatus will effect the turning off of the burner 43 and turning on the water pumping mechanism. In the normal automatic operation, the blower will be energized for the cooling phase but not for the heating phase, although manual controls are provided whereby the blower may be utilized in the heating phase if desired. Likewise, manual controls are provided so that the pumping mechanism may be activated during the heating phase, where humidification of the air is called for.

These results may be accomplished by the control apparatus shown in Fig. 2. Burner control valve 46, in this system, is normally closed and is actuated to the open position through a solenoid energizing circuit including a "hot wire" conductor 50, connected to a contact 51 of thermostat 47. Thermostat 47 is arranged with its movable arm connected to a conductor 52 leading to a suitable source of electric power 53. Thermostat 47 is arranged to engage contact 51 when temperature drops to the heating range. Thus valve 46 will be energized to the open position, feeding gas to burner 43 which will be ignited by pilot 45 to operate the heating phase of operation, in which heat is delivered into the room by direct radiation from radiant 48 through front grille openings 22 and by convection air currents entering through the lower portion of grille 14, brushing the radiant 48 and leaving through the upper portion of grille 14 as indicated by arrows 54.

Blower 38 is operated by an electric motor 55 which is energized through a "hot wire" conductor 56 leading to the movable arm of a two-way manual switch 57. With the switch 57 closed on its contact 58, (which is connected to main power lead conductor 52) blower 38 will be energized without reference to the automatic operation of the apparatus.

Manual switch 57 has a second contact 59 upon which it is adapted to be closed so as to establish a circuit through a conductor to a contact 61 of thermostat 47, positioned to be engaged when room temperature reaches the high temperature range in which cooling is called for. Contact 59 establishes the "automatic" position of manual switch 57, and with the switch in this position, blower 38 will be actuated only when temperature conditions are calling for a cooling operation.

Simultaneously with the automatic energizing of blower 38 through contact 59, a circuit is established through a conductor 62, from contact 61 to a contact 63 of a manual switch 64. Manual switch 64 controls the flow of current to a conductor 66 extending from manual switch 64 to the motor 67 of water pump 28, whereby the latter is actuated when thermostat 47 closes on contact 61. A second contact 68 of switch 64 provides for manual control of pump 28, so that it may be actuated at any time at the will of the operator, regardless of the automatic control.

It will now be apparent, that when the two switches 57 and 64 are closed on their "automatic" positions, that the following automatic operation of the apparatus will take place: when temperature drops to the range in which heat is called for, thermostat 47 will close on contact 51, establishing a circuit through conductor 30 to burner control valve 46, opening the valve and causing the burner 43 to be ignited. Heat will then be delivered by radiation and conduction from radiant 48, through grill 14 into the room. If the operator desires, the delivery of heat may be modified by a current of air delivered through blower 38, in which case switch 57 will be reversed and closed upon its contact 58 (manual position).

Returning to the condition in which both switches 57 and 64 are in their "automatic" positions, when the temperature in the room is at a desirable level for living purposes, the thermostat 47 will stand in an open position between both contacts 51 and 61, and the apparatus will be inactive. If then the temperature should rise to a point within the range in which cooling is called for, thermostat 47 will close on contact 61, closing the circuit to conductors 60 and 62 to the respective manual switches 57 and 64 and thence to conductors 56 and 66, to simultaneously energize blower 38 and water pump 28. The burner 43 will remain inactive, and the blower and water pump will be energized to deliver a current of air upwardly as indicated by arrows 18 and to pump water into the trough 27 from which it is distributed downwardly through ducts 36 into the moisture dispersion panel 25. The air currents created by blower 38 will be drawn through the panel 25, absorbing moisture therefrom and thereby cooled by evaporative action, and will be discharged through louver openings in cap 15 as indicated by arrow 17.

The modified form of Fig. 5

Fig. 5 illustrates the modified form of the apparatus, the same as that of Figs. 1–4 with the exception that the lateral wall of the casing is in the form of a continuous tubular member 12a of expanded metal, and a single tubular water dispersion sleeve 25a is disposed within tubular casing member 12a. Also, instead of the gas burner 43 and radiant 48, there is provided an electric heater element 43a, which may be energized through a power feed conductor 50a having the same position in the control circuit of the apparatus as the conductor 50 of Fig. 2. The reflector baffle 19 is omitted and the air is forcibly circulated by blower 38 both in the heating and the cooling phases. Accordingly, the motor 55 of blower 38 will have a current feed connection to both conductors 50 and 66, whereby the blower will be automatically operated in both heating and cooling phases, but will be turned off in the intermediate, inactive phase. The remainder of the control circuit may be the same as that shown in Fig. 2.

Instead of the porous lining 25, it would be possible to utilize a fin-tubing, arranged in undulations adjacent the inner face of casing 12, with the ends thereof connected to a small refrigerating unit, and with the tubing functioning as the evaporating unit of the refrigeration system.

I claim:

1. A compact combination air heater and cooler comprising: a casing including a water pan constituting the bottom thereof, a tubular casing body of generally oblong cross section projecting upwardly from said pan, said tubular body being of air pervious material and including a front portion constituting a grille for the emission of heated air, and a cap covering the upper end of said tubular body and having a plurality of louvers defining openings for the emission of cooled air; a lining of air pervious, water absorbent cellular material supported against the inner wall of said tubular body in registration with the air pervious portion thereof and extending from the side margins of said grille around the remaining circumference thereof, said lining having at its upper end a rim defining a water distribution trough, and having a network of interstices communicating with said trough and with each other and extending throughout the body of said lining; a reflector baffle disposed within said casing and dividing the same into a cooling chamber defined between the rear of said baffle and the inner wall of said lining and a heater chamber defined between the forward side of said baffle and said grille; a water pump within in said cooling chamber having an inlet within said pan, for withdrawing water therefrom, a water delivery tube extending upwardly from the outlet of said pump and having an upper end sufficient for delivery of water into said trough; a blower in said cooling chamber, positioned to draw air through said air pervious tubular body and lining and to direct its discharge upwardly through said cooled air emission openings; and heater mechanism in said heater chamber, for delivering heat horizontally through said grille.

2. A combined heater and cooler as defined in claim 1, wherein said heater mechanism includes a gas burner disposed within the confines of said pan in the lower portion of said heater chamber and a refractory radiator element positioned above said gas burner in a position for directing radiant heat through said grille and for heating the air by conduction in said heater chamber.

3. A combined heater and cooler as defined in claim 2, wherein said baffle in inclined upwardly and toward said grille, for deflecting convection currents forwardly through said grille.

References Cited in the file of this patent

UNITED STATES PATENTS

| Number | Name | Date |
|---|---|---|
| 2,268,540 | Andrews | Jan. 6, 1942 |
| 2,368,343 | Buskirk | Jan. 30, 1945 |
| 2,588,612 | Brookins | Mar. 11, 1952 |
| 2,631,021 | Arnold | Mar. 10, 1953 |
| 2,631,829 | Carraway | Mar. 17, 1953 |